United States Patent [19]

Desse et al.

[11] 4,019,538

[45] Apr. 26, 1977

[54] CENTERING AND FIXING MEANS AND METHOD FOR ITS FABRICATION

[75] Inventors: Pierre Desse, Orleans; Jean-Pierre Trezeguet, Venissieux, both of France

[73] Assignee: Les Cables de Lyon, Lyon Cedex, France

[22] Filed: Apr. 3, 1975

[21] Appl. No.: 564,974

[30] Foreign Application Priority Data

Apr. 25, 1974 France ............................ 74.14462

[52] U.S. Cl. ............................ 138/108; 138/112; 138/113; 138/140; 138/175; 138/177; 138/178

[51] Int. Cl.² ........................................ F16L 9/14

[58] Field of Search .......... 138/108, 148, 149, 177, 138/140, 175, 112, 113, 178; 264/83, 267, 269, 261, 262

[56] References Cited

UNITED STATES PATENTS

| | | | |
|---|---|---|---|
| 3,548,884 | 12/1970 | Ambrose | 138/149 X |
| 3,561,494 | 2/1971 | Hackett | 138/140 X |
| 3,630,237 | 12/1971 | Varnell et al. | 138/177 X |
| 3,695,483 | 10/1972 | Pogorski | 138/149 X |
| 3,709,772 | 1/1973 | Rice | 138/177 X |

FOREIGN PATENTS OR APPLICATIONS

| | | | |
|---|---|---|---|
| 2,076,379 | 9/1971 | France | 138/140 |

*Primary Examiner*—Richard E. Aegerter
*Assistant Examiner*—James E. Bryant, III
*Attorney, Agent, or Firm*—Sughrue, Rothwell, Mion, Zinn & Macpeak

[57] ABSTRACT

The invention concerns the centering and the fixing of a long thin object inside a tubular body. It has as its object a means consisting in a filling in of the space left free by the long thin object inside the tubular body with a granular substance at least a part of which is agglomerated by means of a resinous isocure compound hardening when cold in a very short time on coming into contact with a gaseous catalyst. It applies more particularly to the centering of a wave guide in a metallic tube.

3 Claims, 1 Drawing Figure

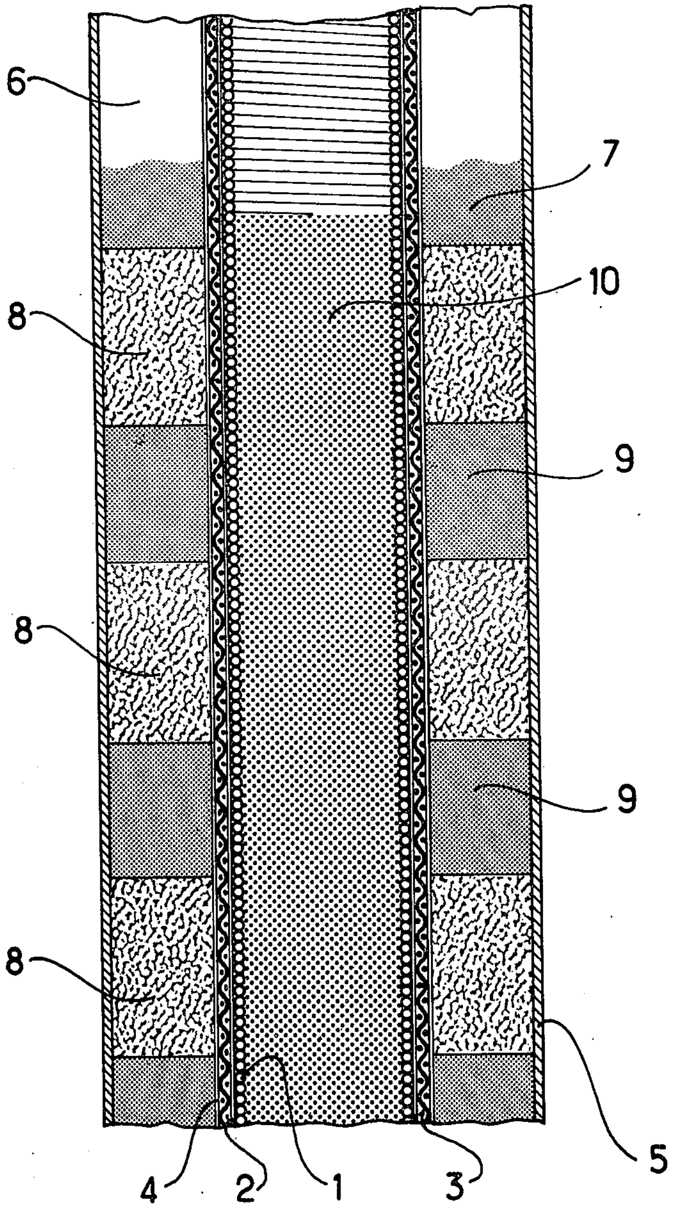
6
7
10
8
9
8
9
8
5
4
2
1
3

CENTERING AND FIXING MEANS AND METHOD FOR ITS FABRICATION

BACKGROUND OF THE INVENTION

FIELD OF THE INVENTION

The invention concerns the centring and fixing of a long thin object inside a tubular body.

Its aim is to produce such centring and such fixing without making the long thin object or the tubular body undergo mechanical and thermal stresses.

SUMMARY OF THE INVENTION

It has as its object a means for centering and fixing a long thin object inside a tubular body, comprising, between the long thin object and the internal wall of the tubular body, a filling material made of a granular substance at least a part of which is agglomerated by a resinous compound hardening when cold, in a very short time in contact with a catalyst made to flow by a gas.

It also has as its object a method for producing such a centering and fixing means consisting in:

Arranging the tubular body in the vertical position with the long thin object placed inside it in its final position;

Filling in, by gravity, the space left free for the long thin object inside the tubular body with layers of granular material at least one of which is previously coated with a phenolic resin with an isocyanate;

And blowing into the said space a catalyst such as an amine made to flow by a gas.

BRIEF DESCRIPTION OF THE DRAWINGS

Other characteristics and advantages will become apparent from the following description of a means according to the invention for centring and fixing a wave guide in a tubular casing. That description is given by way of an example having no limiting character. It is made with reference to the single FIGURE showing a longitudinal cutaway view of the wave guide in its casing surrounded by the centring and fixing means.

DESCRIPTION OF THE PREFERRED EMBODIMENT

The wave guide comprises, in a known way, an internal conductive winding 1 formed by a metallic wire wound in contiguous turns and externally covered with a layer of fibre glass 2, a layer of woven copper gauze 3 and a second layer of fibre glass 4. The various layers of fibre glass 2 and 4 and of woven copper gauze 3 are interconnected and connected to the conductive winding 1 by a hardened synthetic resin.

The wave guide is arranged vertically in the axis of the metallic tube 5, which is also vertical. It is preferably set in the extended position so as to ensure better its straightness. The free space between the internal wall of the tube 5 and the external wall of the wave guide is filled by gravity with a granular substance 7 such as sand or very fine glass powder. This filling in is effected in alternate layers, the ones 8 being coated with a mixture of a phenolic resin with an isocyante, the others 9 not being coated. At the time of that filling in, to cancel the hydrostatic efforts exerted by the granular substance 7 on the external wall of the wave guide, the inside of the wave guide is also filled at the same rhythm with a substance 10 having the same density as the granular substance 7. The substance 10 has been shown in the figure as a granular substance having larger grains. Once the filling in by gravity of the space 6 is finished, a catalyst such as an amine made to flow by a gas such as carbon dioxyde is blown in through one end of the tube 5. The mixture of phenolic resin with isocyanate hardens on coming into contact with the amine in a very short time (a few seconds) and at ambient temperature.

Due to the filling in by gravity and to the compensation of the hydrostatic pressure, all mechanical stress on tthe wave guide is avoided. All deformations which could be caused on it by heat treatment are also avoided.

The mixtures of phenolic resins with isocyanates are well-known in founding for effecting cold moulding in hardened sand. For more ample explanations on these mixtures, as well as for the choice of the catalyst, this technique should be referred to.

The granular substance used can be quite diverse. It is preferable for its grains to be neutral, non-porous and anhydrous. For the coating thereof, the percentage of resin is chosen between two limits; it must be sufficiently high to enable the effective agglomerating of the coated granular substance and sufficiently low to leave the granular substance porous once it has been coated, in order to enable the diffusing of the catalyst.

After the blowing of the amine which is made to flow by the carbon dioxyde into the space 6, the layers of coated granular substance 8 are agglomerated and separated from one another by layers of free granular substance 9, this imparting to the assembly formed by the wave guide and its casing a certain resilience, it being possible to modify that resilience by varying the proportions of the thickness of the layers of coated and non-coated granular substance.

The centering method according to the invention is not restricted to the example described but can be used to great advantage each time a long thin object is to be centred, positioned and fixed inside a tubular body. In the case where the long thin object is hollow, it is an advantage to fill it with a non-coated granular substance at the same operating rhythm as the free space between the object and the internal wall of the tube.

We claim:

1. In combination, a tubular body having an axially extending internal wall, a long thin object axially disposed inside said tubular body, a filling material made of a granular substance extending between the long thin object and the internal wall of said tubular body, said filling material comprising an axial succession of agglomarated layers separated by non-agglomarated layers of granular substance, said agglomarated layers comprising filling material being agglomaratedly hardened in situ by a resinous compound hardened when cold, in a short time by contact with a gas borne catalyst such that the assembly formed thereby is free of thermal stress.

2. The combination according to claim 1, wherein said granular substance is sand.

3. The combination according to claim 1, wherein said granular substance is constituted by very fine glass powder.

* * * * *